Jan. 17, 1967  E. J. HALTER  3,298,759
BALL BEARING ASSEMBLY
Filed June 28, 1963
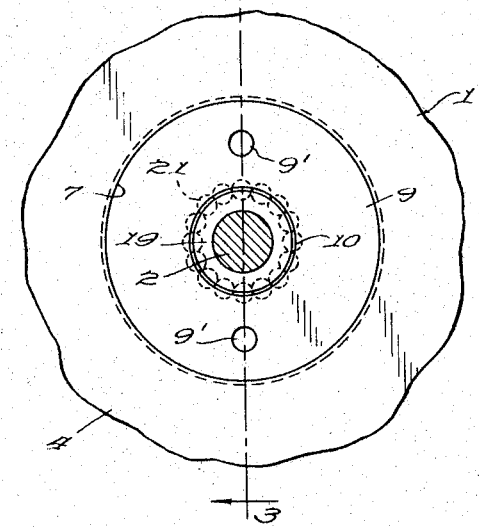
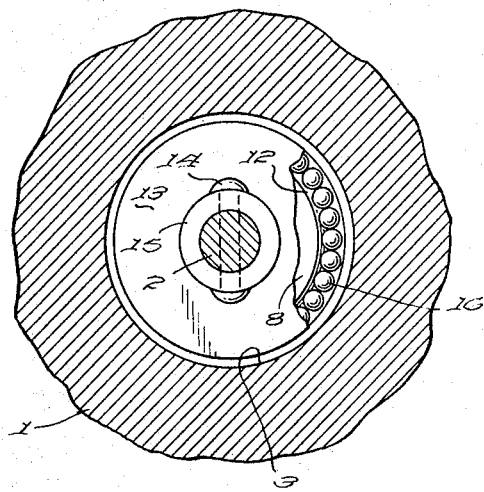
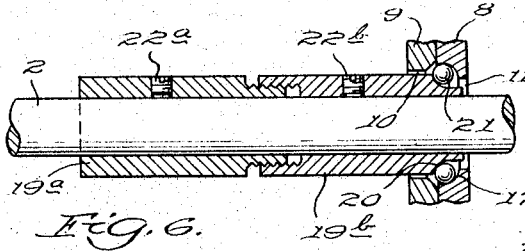
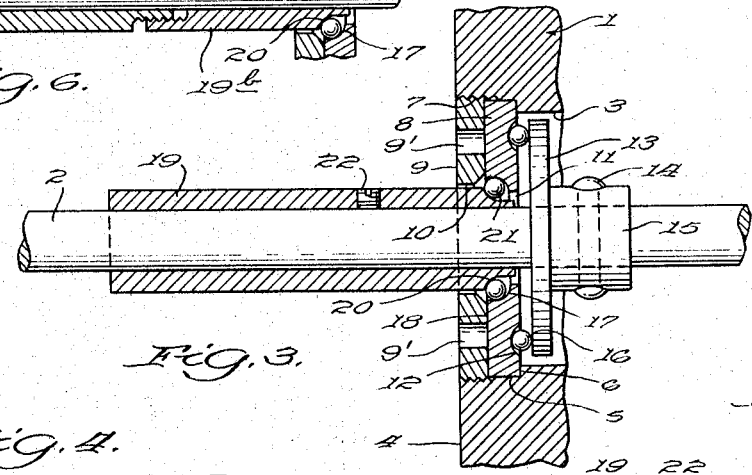
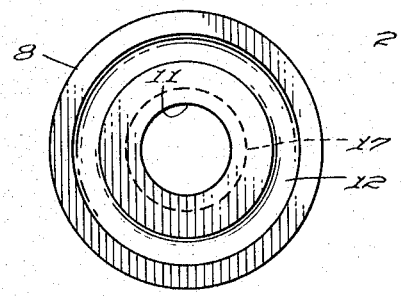
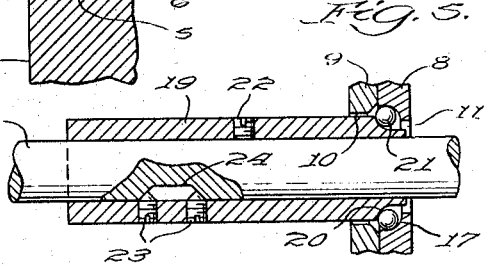
Inventor:
Ernest J. Halter.
By Harold J. L. Vesconte
Atty.

United States Patent Office 3,298,759
Patented Jan. 17, 1967

3,298,759
BALL BEARING ASSEMBLY
Ernest J. Halter, Hawthorne, Calif.
(4314 W. 234th Place, Torrance, Calif. 90505)
Filed June 28, 1963, Ser. No. 291,497
7 Claims. (Cl. 308—175)

This invention relates to ball bearing construction and particularly to a compact form thereof effective to resist both radial and axial thrust.

The principal object of the invention is to provide a ball bearing construction for combined axial and radial thrust which is compact in form, is composed of few parts of simple design, is susceptible of economical manufacture, is readily adjustable to attain a desired clearance, and for which, close machining tolerances in the mechanism in which it is to be installed are not required.

With the foregoing objects in view, together with such additional objects and advantages as may subsequently appear, the invention resides in the parts and in the construction, combination and arrangement of parts described, by way of example, in the following specification of certain presently preferred embodiments of the invention, reference being had to the accompanying drawings which form a part of said specification and in which drawings:

FIG. 1 is an end elevation of a portion of a mechanism comprising a portion supporting frame structure in which a shaft is mounted for oscillation or rotation by means of a ball bearing construction embodying the present invention, FIG. 2 is an end elevational view of the bearing shaft and supporting frame portion as viewed from the opposite side of that shown in FIG. 1, FIG. 3 is a medial transverse sectional view taken on the line 3—3 of FIG. 1, FIG. 4 is a side elevational view of the stationary ball race member component of the invention as viewed from the right hand side of FIG. 3, and FIGS. 5 and 6 are fragmentary medial sectional views similar to FIG. 3 but showing different modes of positive adjustment of the clearance in the bearing structure per se.

Referring first to FIGS. 1 through 4 of the drawings there is shown a portion of a frame member 1 of a mechanism having an opening therethrough to be described in detail and through which opening a shaft 2 extends and is journaled in said opening by a bearing structure comprising a presently preferred embodiment of the present invention. While the description of the invention relates to a rotatable or oscillatable shaft and a stationary support for the bearing of the shaft, it will be realized that, where desired, the shaft might be the stationary component and that the component here referred to as the frame member 1 might rotate or oscillate thereon.

In the illustrated embodiment, the frame member 1 is provided with a bore 3 extending from a face of said frame member (not shown) toward the exterior face 4 of said member and opens into a counterbore 5 with which it forms an annular shoulder 6. Between the counterbore 5 and the said outer face 4 there is a slightly larger internally threaded portion 7. Disposed in the counterbore 5 and seated on the shoulder 6 thereof is the outer peripheral portion of a generally disk-like stationary race member 8 secured therein by a nut element 9 engaging the threaded portion 7 of the bore; said nut member having suitable wrench engaging means such as, for example, spanner wrench engaging holes 9'. Also, the nut element 9 is provided with an axial bore 10 which is considerably larger than the shaft 2 and the race member 8 is similarly provided with an axial bore 11 which is also considerably larger than the diameter of the shaft 2 but is smaller than the bore 10.

The face of the stationary race member 8 at the side thereof engaging the shoulder 6 and inwardly of said shoulder affords a surface which is provided with a shallow circular ball race groove 12 disposed coaxially with respect to the bore 11 and the shaft 2 carries a parallel, radially extending flat surface here afforded by a side of a flange 13; said flange being secured to the shaft in any appropriate way as, for example, by a pin 14 extending through a hub portion 15 formed integrally with the flange and through the shaft 2. Alternatively, of course, this flange could be formed integrally with the shaft or could be otherwise attached thereto. Mounted in the groove 12 and held therein by engagement with the flange 13 is a series of bearing balls 16 which thus absorb axial thrust developed by axial loads tending to move the shaft 2 to the left as viewed in FIG. 3 or, assuming that the shaft is fixed, by axial loads tending to move the frame member 1 to the right as viewed in that figure.

The stationary race member 8 is further provided with a second ball bearing race groove 17 extending between the face 18 of the member 8 which is contacted by the nut element 9 and the bore 11 in said race member and mounted on and movable with the shaft 2 is a sleeve member 19 having an end extending through the bore 10 in the nut element 9 and bore 11 in the race member 8; said end terminating in convex ball race groove 20 extending between the outer diameter of said sleeve member and said end of said sleeve member and opposing the race groove 17. The said ball race grooves 17 and 20 thus combine to form a raceway for a series of bearing balls 21. The relation of the grooves 17 and 20 to each other by reason of being formed at what would otherwise be corners causes the groove 17 to be of greater radial dimension with respect to the axial line of the shaft 2 than the complementary groove 20 but the difference in the resulting diameters of the two grooves is less than twice the diameter of one of the balls 21 and consequently the grooves are laterally offset from each other so that the balls 21 are retained in the race thus formed and able to resist both radial loads and axial thrust loads in a direction opposite to thrust loads resisted by the balls 16.

There remains to be described certain means by which adjustment clearance may be achieved in the above described ball bearing. First, it is believed to be obvious that as the sleeve and shaft are moved axially relatively to each other tending to move the sleeve toward the flange 13, the clearance of both sets of balls in their respective races is simultaneously reduced. Referring to FIG. 3, the sleeve 19 is shown secured in endwise adjustment on the shaft by a setscrew 22. In this arrangement manual pressure on the shaft and on the sleeve is employed to achieve such axial adjustment between the shaft and sleeve as will produce the desired clearance after which the setscrew 22 is tightened to hold the shaft and sleeve in that position.

IN FIG. 5, in addition to the setscrew 22, cone pointed screws 23, 23 engage the opposite, complementary tapered or sloped ends of the groove 24 formed in the shaft 2 to effect positive relative endwise movement between the shaft and sleeve by loosening one screw and tightening the other, the sleeve being thereafter further secured by the setscrew 22.

In FIG. 6, the sleeve 19 is divided into two sections 19a and 19b which are threadedly interengaged at their adjacent ends and are secured on the shaft by setscrews 22a and 22b, respectively. By first locking the outer sleeve 19a to the shaft, the inner end 19b can then be rotated to achieve the desired axial adjustment and can then be secured to the shaft by the setscrew 22b.

Thus there has been achieved a ball bearing construction which may be of very small axial dimensions and which is composed of parts which are simple in construction and economical to manufacture. Moreover, the mechanism in which the bearing is situated need not be machined with any great degree of accuracy since it will be obvious that if the axial adjustment between the shaft and the bearing is achieved before the final tightening of the nut member 9, tightening of that nut member will not affect the axial adjustment of the bearing and the parts will have self-aligned themselves with each other and this factor aids greatly in the economical manufacture and assembly of mechanisms in which bearings of this character may be employed.

While in the foregoing specification there have been disclosed certain presently preferred embodiments of the invention, it is not to be deemed that the invention is limited to such precise details of construction, and it will be understood that the invention includes as well all such changes and modifications in the parts and in the construction, combination and arrangement of parts as shall come within the purview of the appended claims.

I claim:

1. A ball bearing assembly for resisting both radial loads and axial thrust loads and including a shaft, first and second ball bearing means, said first ball bearing means comprising rigid first and second members relatively rotatably movable about a common axial line of said shaft; said members presenting one each of a pair of parallel, opposed surfaces spaced from each other and disposed normal to said axial line, said first member being mountable on said shaft and said second member being mountable on an associated component of a mechanism for relative rotary movement of said members between said shaft and the associated component about the axial line of the shaft, one of said members having an annular ball race comprising a groove formed in the surface thereof constituting one of said parallel, opposed surfaces and disposed coaxially with respect to the axial line of the shaft and having a first series of bearing balls disposed in said groove and retained therein by the parallel opposed surface of the other of said members; said second ball bearing means comprising means effective to resist both axial thrust loads in the direction opposite the loads resisted by said first ball bearing means and radial loads and including a second ball race formed by juxtaposed, opposing ball race grooves formed, respectively, in said second member of said first ball bearing means and in a third member carried by the shaft and a series of bearing balls in said second ball race, the ball groove for said second ball bearing means formed in said second member of said first ball bearing means being of greater radial dimension with respect to the axial line of the shaft than the complementary groove of said second ball race formed in said third member by an amount which is less than the diametral dimension of one of the bearing balls contained in said second ball race, said third member and the ball race groove thereof being disposed at the side of said second member of said first ball bearing means with which it cooperates which is remote from said first member of said first ball bearing means.

2. A ball bearing assembly as claimed in claim 1 in which said one of said members retaining said first series of bearing balls in said first ball race groove and said means carrying the smaller one of said pair of juxtaposed ball race grooves are incapable of relative rotational movement and include means for effecting adjustment toward and away from each other parallel to said axial line.

3. A ball bearing assembly as claimed in claim 1 including means adjustable parallel to said axial line operable to simultaneously effect the provision of a desired operating clearance between both of said series of bearing balls and their respective races axially and radially.

4. A ball bearing assembly as claimed in claim 1 in which said ball race groove of said first ball bearing means is of greater radial dimension relative to said axial line than either of said juxtaposed pair of ball race grooves and is formed in the same member as the one of said juxtaposed pair of grooves which is of the greater radial dimension with resultant reduction of the axial space required to accommodate said assembly.

5. A ball race assembly as claimed in claim 1 in which said one of said members constitutes a disc-like element having an axial opening extending therethrough, one side of said element constituting the one of said parallel surfaces having said first named ball race groove, in which the other of said surfaces constitutes the side of a flange carried by one of the mechanism components which extends through said opening in said disc-like element in axial relation thereto, in which the ball race groove of said second ball bearing means is formed on the side of said disc-like element opposite the side carrying said first named ball race groove, and in which the means carrying the one of said juxtaposed pair of ball race grooves which is of the lesser radial dimension is carried by the one of the mechanism components that carries said flange.

6. A ball bearing assembly as claimed in claim 5 in which said means carrying said one of said juxtaposed pair of ball race grooves of lesser radial dimension is composed of two sections, one of which carries said ball race groove of lesser radial dimension, threadedly interconnected for adjustment of said one section along said axial line toward and away from said flange surface to vary the clearance between said bearing balls of both of said ball bearing means and their respective grooves.

7. A ball bearing assembly as claimed in claim 5 in which said means carrying said one of said juxtaposed pair of ball race grooves of lesser radial dimension includes screw threaded means having inclined plane engagement with the mechanism component by which it is carried; said screw threaded means being operable to effect positive adjustment of said ball race groove carrying section along said axial line toward and away from said flange to vary the operating clearance of said bearing balls of both of said ball bearing means in their respective races.

References Cited by the Examiner

UNITED STATES PATENTS

| 1,179,693 | 4/1916 | Brault | 308—174 |
| 1,321,151 | 11/1919 | Rowley | 308—174 |
| 1,336,812 | 4/1920 | Bott | 308—174 |
| 1,455,213 | 5/1923 | Larsson. | |
| 2,404,269 | 7/1946 | Bennett. | |
| 2,427,226 | 1/1947 | Muhlbach | 308—174 |

FOREIGN PATENTS 2,295   1/1914   Great Britain.

MARTIN P. SCHWADRON, *Primary Examiner.*

FRANK SUSKO, *Examiner.*

R. F. HESS, *Assistant Examiner.*